United States Patent [19]
Clark

[11] 3,921,242
[45] Nov. 25, 1975

[54] WINDOW BRUSH

[76] Inventor: Gaylord J. Clark, P.O. Box 216, Coloma, Mich. 49038

[22] Filed: Feb. 27, 1974

[21] Appl. No.: 446,216

[52] U.S. Cl. ............... 15/21 D; 15/DIG. 2; 64/30 C
[51] Int. Cl.² ............................................ B60S 3/06
[58] Field of Search ............ 15/DIG. 2, 21 D, 21 E, 15/53, 82, 83, 97; 64/30 R, 30 C

[56] References Cited
UNITED STATES PATENTS

| | | | |
|---|---|---|---|
| 1,692,980 | 11/1928 | Farmer | 15/23 |
| 2,185,229 | 1/1940 | Scott | 15/23 X |
| 3,506,995 | 4/1970 | Larson et al. | 15/21 D |
| 3,517,405 | 6/1970 | Hanna et al. | 15/21 D |

*Primary Examiner*—Edward L. Roberts
*Attorney, Agent, or Firm*—Woodhams, Blanchard and Flynn

[57] ABSTRACT

A rotary brush construction, particularly for washing vehicles, wherein a substantially cylindrical brush section is disposed in surrounding relationship to and is driven by a rotatable drive shaft. The brush section is drivingly connected to the shaft by a torque limiting clutch assembly which permits slippage of the brush section when the external torque imposed on the brush section exceeds a predetermined limit.

11 Claims, 6 Drawing Figures

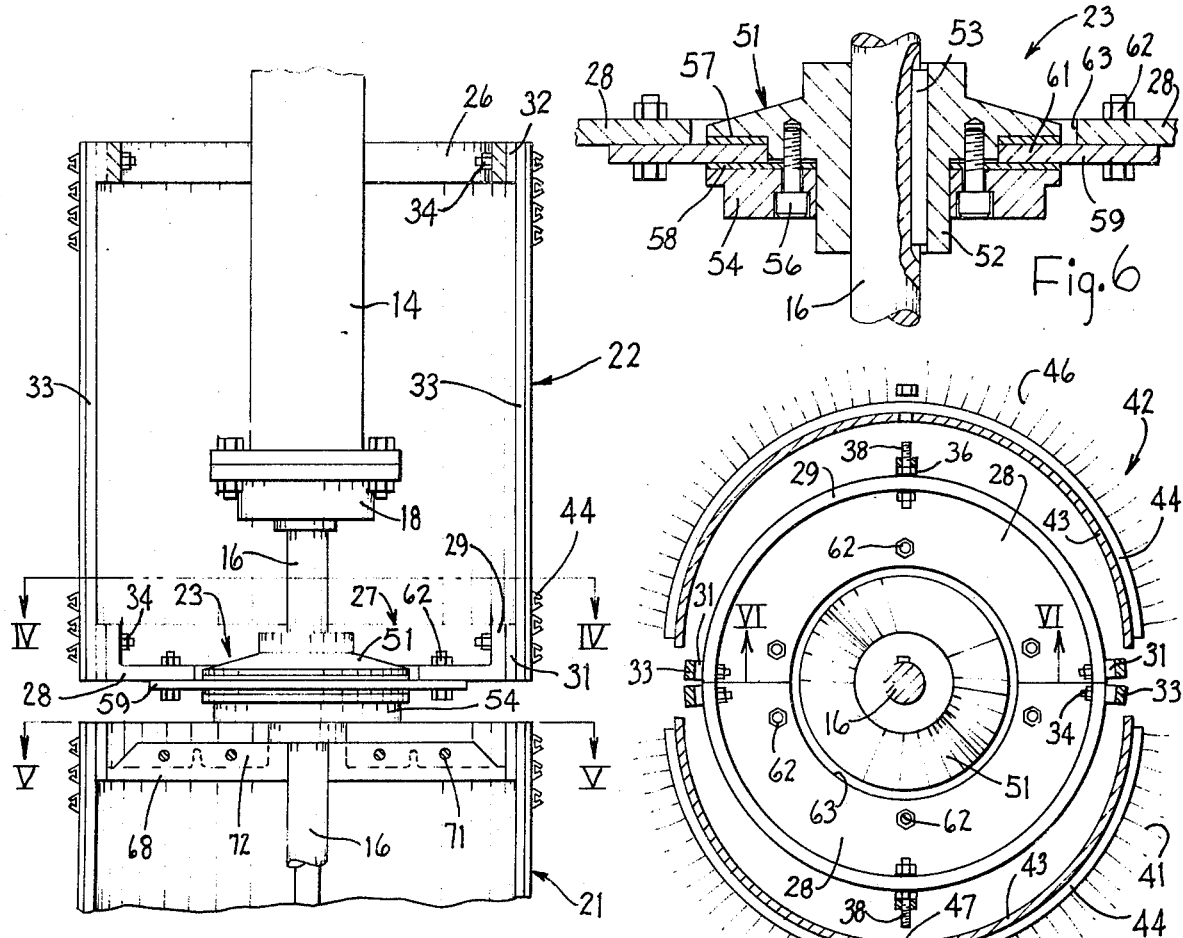

WINDOW BRUSH

FIELD OF THE INVENTION

This invention relates to an improved rotary brush construction and, in particular, to a rotary brush construction of the type adapted for use in washing vehicles, which brush construction incorporates therein a torque limiting clutch assembly for permitting stopping of the brush rotation if the brush bristles become hung-up on the vehicle.

BACKGROUND OF THE INVENTION

One of the problems which has long been experienced in automatic car washing operations is the problem of damage caused both to the vehicle and the brush structures due to the brush bristles becoming hung-up on the vehicle, such as on antennas, outside rearview mirrors and the like. These projecting portions of the vehicle have necessarily required that the rotary brushes be provided with rather long and flexible bristles to permit the hub of the brush construction to safely pass by the projections. However, these long and flexible bristles tend to wrap around the vehicle projections during rotation of the brush assembly as the brush assembly travels longitudinally along a vehicle surface. When this happens, the bristles are not easily disengaged from the projection so that the brush assembly and the projection tend to be rather rigidly coupled together, whereby the linear traversing of the brush along the vehicle results in excessive forces being applied both on the brush assembly and on the vehicle. Needless to say, this often results in damage to the vehicle, such as by breaking off the antenna. Similarly, this may result in damage to the brush assembly, such as by pulling out the bristles or damaging the drive mechanism. While numerous attempts have been made to overcome this long standing problem, such as by varying the design of the brush construction and/or the bristles, and by using various spring loading devices for urging the brush assembly against the vehicle, nevertheless none of these known systems have, to the best of my knowledge, totally succeeded in eliminating this problem.

Accordingly, it is an object of the present invention to provide a rotary brush construction, particularly for washing vehicles, which substantially overcomes the above-mentioned problem. The brush construction of the present invention includes means associated with the rotary brush for permitting stopping of the brush in the event the bristles become hung-up on the vehicle. More specifically, the present invention provides an improved brush construction, which incorporates an adjustable torque limiting clutch assembly drivingly connected between the rotary brush and the driving shaft to permit slippage or stoppage of the brush when a preselected torque is reached, such as if the bristles become hung-up on the vehicle, while at the same time the clutch assembly provides the brush unit with the required overall rigidity.

It is also an object of the present invention to provide an improved brush construction, as aforesaid, which enables use of a cylindrical brush which can be constructed and assembled extremely economically, which incorporates therein a torque limiting clutch which is both mechanically and operationally simple, and which requires little maintenance.

Other objects and purposes of this invention will be apparent to persons acquainted with devices of this type upon reading the following specification and inspecting the accompanying drawings.

BRIEF DESCRIPTION OF THE DRAWINGS

FIG. 3 is an enlarged, fragmentary, sectional elevational view of the improved brush construction of the present invention.

FIG. 4 is an exploded sectional view taken substantially along the line IV—IV in FIG. 3.

FIG. 5 is a sectional view taken substantially along the line V—V in FIG. 3.

FIG. 6 is an enlarged, fragmentary, sectional view taken substantially along the line VI—VI in FIG. 4.

Figure 1:
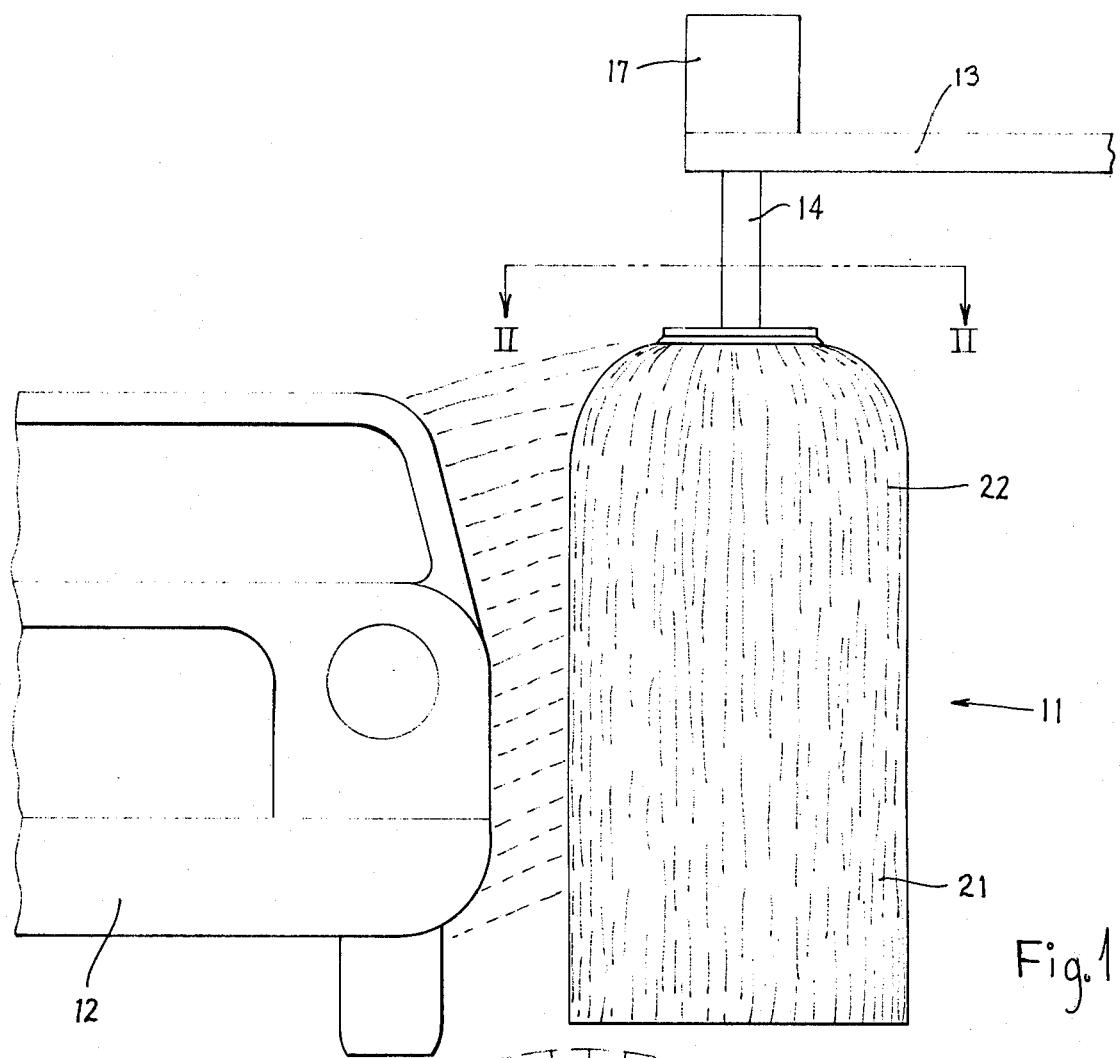
FIG. 1 is an elevational view illustrating a rotary brush construction in association with a vehicle, which brush construction incorporates therein the improvements of the present invention.
Figure 2:
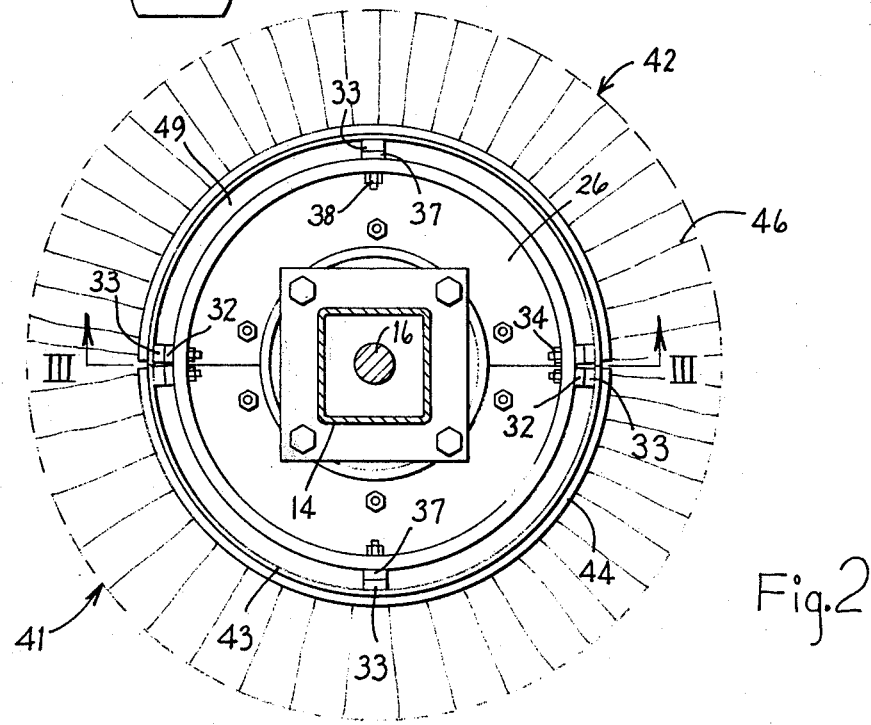
FIG. 2 is a sectional view taken substantially along the line II—II as appearing in FIG. 1.

Certain terminology will be used in the following description for convenience in reference only and will not be limiting. For example, the words "upwardly," "downwardly," "leftwardly" and "rightwardly" will refer to directions in the drawings to which reference is made. The words "inwardly" and "outwardly" will refer to directions toward and away from, respectively, the geometric center of the brush construction and designated parts thereof. Said terminology will include the words above specifically mentioned, derivatives thereof and words of similar import.

SUMMARY OF THE INVENTION

The objects and purposes of the present invention are met by providing a rotary brush construction, specifically for washing vehicles, which includes a cylindrical brush section having a plurality of elongated bristles fixed to and projecting radially outwardly from a drum-like support member. The brush section is disposed in surrounding relationship to and is drivingly connected to a rotary drive shaft. A torque limiting clutch assembly is drivingly connected between the shaft and the brush section for permitting slippage or stoppage of the brush section when the external torque imposed on the brush section exceeds a preselected level, such as when the bristles hang-up on the vehicle. The torque limiting clutch assembly is preferably of the friction type and, when the brush construction is in a preferred vertical orientation, functions to support the brush section on the shaft so that the weight of the brush section normally provides sufficient frictional engagement within the clutch assembly to provide for desired driving of the brush section under normal washing operations.

DETAILED DESCRIPTION

FIG. 1 illustrates therein a rotary brush assembly 11 for washing a vehicle 12, specifically the side surfaces thereof. The brush assembly, in a conventional manner, includes a movable overhead support arm 13 which is designed to move the brush horizontally along the vertical surfaces of the vehicle, such as the side surfaces and portions of the front and rear surfaces. The support arm 13 has a downwardly projecting and substantially vertically oriented support shaft 14 fixed adjacent the free end thereof, which shaft 14 in the illustrated embodiment is of a substantially square and tubular configuration. A rotatable drive shaft 16 projects vertically downwardly through the support shaft 14 and is rotatably driven in a conventional manner by a motor 17. The lower end of support shaft 14 has a bearing support member 18 fixed thereto for rotatably supporting the drive shaft 16.

The drive shaft 16 has a pair of substantially cylindrical and axially spaced, rotary brush sections 21 and 22 disposed in surrounding relationship thereto. The lower brush section 21 is normally referred to as the wrap-around brush since it washes the lower portions of the vehicle side surfaces, and the front and rear surfaces of the vehicle. The upper brush section 22 is normally referred to as the window brush since it washes the vehicle side surfaces in the vicinity of the windows. The window brush 22 is, according to the present invention, drivingly connected to the drive shaft 16 by means of an intermediate torque limiting clutch assembly 23 to permit stoppage or slippage of the window brush 22 in the event that the bristles thereof become hung-up on the vehicle.

Considering now the window brush 22, same includes upper and lower ringlike collars 26 and 27, respectively, the lower collar 27 being formed from a pair of substantially semicircular plates 28 (FIG. 4) each having an upwardly projecting annular flange 29. A blocklike spacer 31 is fixed to the outer surface of each flange 29 adjacent the end thereof, and a similar spacer 32 is fixedly secured to the outer surface of the upper collar 26 in substantial alignment with the spacer 31. The spacers 31 and 32 are disposed in axially aligned relationship and are fixedly interconnected by axially elongated mounting bars 33, which bars have their opposite ends fixedly anchored to the upper and lower collars by means of bolts or other conventional fasteners 34.

Each of the plates 28 associated with the lower collar 27 has a further spacer 36 fixed to the outer surface thereof and disposed substantially midway between the spacers 31. A further spacer 37 is fixedly connected to the outer surface of the upper collar 26 in axial alignment with a corresponding one of the spacers 36. The corresponding aligned pairs of upper and lower spacers 36 and 37 are fixedly connected by further elongated mounting bars 33, which bars have their upper and lower ends fixedly anchored to the upper and lower collars by means of bolts 38.

The upper and lower collars 26 and 27, by being rigidly connected by the plurality of mounting bars 33, results in the formation of an open, substantially cylindrical drumlike frame which has mounted thereon a pair of opposed and semicylindrical brush segments 41 and 42 (FIG. 4), which segments 41 and 42 are substantially identical and are each removably mounted on the drumlike frame.

The brush segment 41 (or 42) includes a substantially semicylindrical support plate 43 formed on a radius which is similar to the radius defined by the outer surfaces of the mounting bars 33 as defined about the axis of the drive shaft 16. The support plate 43 has a plurality of elongated brush supporting channels 44 fixedly secured to the outer surface thereof, which channels 44 in turn fixedly anchor therein the radially inner ends of a plurality of elongated flexible brush bristles 46. While the channels 44 are illustrated in the drawings as extending circumferentially of the support plate 43, it will be appreciated that the channels 44 could also extend either spirally or axially relative to the support plate if desired.

To permit attachment of the brush segment 41 to the drum-like frame, the support plate 43 is provided with suitable openings 47 therethrough, which openings in the illustrated embodiments are located adjacent the opposite axial ends of the support plate and are disposed substantially midway between the free arcuate edges thereof. These openings 47 are aligned with the bolts 38, with the segment 41 being fixedly mounted on the drumlike frame by means of nuts 48 which engage the outwardly projecting ends of the bolts 38.

With the brush segments 41 and 42 fixedly mounted on the drumlike frame, as explained above, the inner surfaces of the support plates 43 are disposed in engagement with the bars 33, thereby resulting in a narrow annular gap 49 between the outer periphery of the collars and the inner peripheral surfaces of the support plates, which annular gaps facilitates the supply of washing fluid and lubricant, such as soapy water, along the interior of the brush construction. For example, the support plates 43 are preferably provided with a plurality of openings (not shown) extending radially outwardly therethrough so that the soapy water which is supplied into the interior of the brush construction will flow radially outwardly through these openings so as to be supplied adjacent the inner ends of the brush bristles.

The support plate 43, in its disassembled and unstressed condition, is preferably provided with an internal radius which is slightly less than the radius defined by the outer surfaces of the bars 33 such that, mounting of the support plate on the drumlike frame, requires that the opposite arcuate edges of the support plate be slightly elastically deformed away from one another to permit mounting of the support plate on the frame. In this way, the support plate is securely mounted on the frame with the opposite free edges being securely maintained in engagement with the supporting frame.

The detailed construction of the window brush 21, specifically the structure of the drumlike frame and the structure of the brush segments, is explained in greater detail in my copending patent application Ser. No. 440,284, filed Feb. 7, 1974, and entitled Brush Frame and Shell.

Thus, additional detailed description of this structure is not believed necessary.

Considering now the torque limiting clutch assembly 23 which drivingly connects the window brush 22 to the drive shaft 16, same includes a driving clutch member 51 which, as illustrated in FIG. 6, includes an annular hub portion 52 which surrounds and is fixedly secured to the shaft 16, as by means of a key 53. The driving clutch member 51 also includes a plate-like member 54 which surrounds the hub and is disposed directly adjacent thereto, being fixedly connected to the hub portion 52 by means of threaded fasteners, such as screws 56. The hub portion 52 and plate member 54 have opposed radially projecting platelike portions which are spaced from one another and have friction pads 57 and 58 fixedly secured to the opposed surfaces thereof. The friction pads 57 and 58, as illustrated in FIG. 6, are disposed in opposed and substantially parallel relationship to one another, and are spaced a preselected axial distance apart, as determined by the screws 56, so as to define therebetween an annular ringlike recess which surrounds the clutch member 51 and opens radially outwardly. The friction pads 57 and 58 may be constructed of any conventional high-friction material, such as conventional brake lining material as used on vehicles and the like.

The clutch assembly 23 also incudes a driven clutch member 59 which, as illustrated in FIGS. 4 and 6, comprises an annular platelike member having the inner annular portion 61 thereof disposed within the annular recess formed between the friction pads 57 and 58, whereby the opposed side surfaces of the driven member 59 are disposed in frictional driving engagement with the friction pads 57 and 58. The driven member 59 has the outer annular portion thereof disposed in adjacent and overlapping relationship with the lower ringlike collar 27, same being fixedly coupled to the plates 28 associated with the collar 27 by means of a plurality of conventional threaded fasteners such as bolts 62. The lower collar 27 has (see FIG. 6) a concentric opening 63 of rather large diameter formed therein so as to freely accommodate therein the hub portion 52.

As illustrated in FIG. 3, the upper end of the window brush 22 in the vicinity of the collar 26 is totally free of any connection to the support shaft 14 or the drive shaft 16. Further, the lower end of the window brush 22 is also free of connection to the support shaft 14, and is connected to the drive shaft 16 solely by means of a clutch assembly 23. Thus, the clutch assembly 23 functions not only as the means for rotatably driving the window brush 22 from the shaft 16, but also functions as the sole supporting structure for axially supporting the window brush 22 in its desired position relative to the shaft 16. The complete weight of the window brush 22 is thus transferred through the lower collar 27 and the driven clutch plate 59 directly onto the lower friction pad 58, so that the weight of the brush section 22 thus provides a substantial (and in many instances a majority) of the clamping force required between the driving and driven clutch members 51 and 59, respectively, so as to result in the desired rotation of the window brush 22 when the shaft 16 is rotated. However, the magnitude of the clamping force between the driving and driven clutch members 51 and 59, respectively, can be increased by tightening the screws 56 to a greater extent, which increases the clamping force and results in the magnitude of the maximum torque transmittable by the clutch assembly being increased.

Considering now the wraparound brush 21, same is constructed in a manner substantially similar to the brush 22 except that the brush 21 is not connected to the shaft 16 by means of an intermediate torque limiting clutch assembly. The wraparound brush 21 again includes a pair of opposed and individually removable semicylindrical brush segments 66 which are mounted on a plurality of axially elongated mounting bars 67 which extend between and fixedly interconnect a pair of spaced annular collars 68 which are disposed adjacent the upper and lower ends of the brush section, only the upper collar 68 being illustrated in the drawings. The collars 68 each include a pair of substantially semicircular plates 69 which are suitably fixedly coupled together in surrounding relationship to the drive shaft 16, as by means of bolts or screws 71 extending between opposed axially extending flanges 72 which are fixedly coupled to the respective plates 69. The collars 68 are nonrotatably coupled to the drive shaft 16, as by means of a key 73. The overall structure of the wraparound brush 21 is similar to the structure of the brush 22 since same also includes an open drumlike frame which in this case is nonrotatably secured to the drive shaft, which frame then has the brush segments 66 removably mounted thereon, which brush segments may be identical to the brush segments 41 and 42 described above.

The wraparound brush 21 also has a narrow annular gap 74 defined between the brush segments 66 and the collar 68, which gap 74 is defined due to the presence of the intermediate mounting bars 67. The gap 74 in the brush 21 is substantially aligned with the lowermost gap 49 which is defined in surrounding relationship to the flange 29 associated with the lower end of the brush 22. In this manner, soapy water can flow from the interior of the upper brush 22 and through the gaps 49 and 74 into the interior of the lower brush 21. The lubricant then flows radially outwardly through suitable openings (not shown) in the drum for lubricating the brush bristles.

OPERATION

While the operation of brush constructions of this general type for washing vehicles is conventional and well understood, nevertheless the operation of the improved window brush 22 constituting the present invention will be briefly described to insure a complete understanding thereof.

During a conventional car washing operation, the vehicle is positioned within a selected bay or is moved through a suitable washing tunnel, whereupon the brushes relatively move along the sides of the vehicle (as illustrated in FIG. 1) to effect cleaning of the vehicles surfaces. During the relative movement of the brush along the side surface of the vehicle, the drive shaft 16 is rotated causing rotation of the brushes 21 and 22. This results in the bristles 46 being thrown outwardly (as illustrated by dotted lines in FIG. 1) so as to contact the vehicle and effect washing and cleaning thereof. During a normal washing operation when utilizing the brush construction of the present invention, the rotation of shaft 16 causes a corresponding rotation of the driving clutch member 51 which, due to the frictional engagement of the pads 57 and 58 with the opposite surfaces of the driven clutch plates 59, results in a corresponding rotation of the window brush 22. However, since the upper portions of a vehicle often have outwardly projecting objects associated therewith, such as an outside rearview mirror and/or a radio antenna, there is often a tendency for the brush bristles to wraparound these projections. When this happens, the externally applied torque or drag imposed on the window brush 22 suddenly increases to a level whereby the external drag torque exceeds the maximum torque transmitting capacity of the clutch assembly 23. This thus results in slippage of the driven clutch plate 59 relative to the driving surfaces 57 and 58, so that the window brush 22 thus freely slips relative to the driving shaft 16 and, if necessary, the brush 22 will remain in a nonrotatable condition even though the drive shaft 16 continues to rotate. In this manner, the rather large and sudden forces which were previously applied to the projecting objects on the vehicle, such as when the bristles became hung-up thereon, are thus eliminated.

After stoppage of the window brush 22 due to the bristles becoming hung-up on the vehicle, the bristles will normally tend to automatically release themselves from the object due to the continued relative traversing movement of the brush assembly along the side of the vehicle. More specifically, the brush assembly is normally rotated in a direction such that the bristles which engage the surface of the vehicle are moving along the side surface of the vehicle in the same direction as the linear translational movement of the overall brush assembly. Accordingly, if some of the bristles become hung-up on an antenna or outside mirror, this results in stoppage of the rotation of the window brush 22, but the overall brush assembly will continue to slowly linearly move relative to the vehicle longitudinally along the side thereof. This continued relative translation between the vehicle and the brush assembly will normally result in the bristles freeing themselves from the antenna or outside mirror, whereupon immediately upon release of the bristles the friction clutch assembly 23 will again engage and cause continued rotation of the window brush 22 to thus permit completion of the washing operation.

One of the advantages of the present invention results from the fact that the maximum torque transmitting capacity of the clutch assembly 23 can be adjusted to a selected value to provide for optimum operation of the brush assembly and adjustment for wear. For example, by tightening or loosening the bolts 56, the degree of frictional engagement between the driven clutch plate 59 and the driving clutch pads 57 and 58 can be selectively varied. Since rotation of the screws 56 enable the pads 57 and 58 to be moved toward or away from one another, the maximum torque transmitting capacity of the clutch can be easily varied to provide for optimum operation of the brush structure, and at the same time the screws 56 permit the clutch structure to be adjusted so as to compensate for wear of the brake surfaces. Still further, in some situations its is desirable to increase the conveyor speed at which vehicles are being moved through the washing system, which change also effects the rotational speed of the brushes so that the torque required to stop the brush is also changed. A change in the maximum torque transmitting capacity of the clutch assembly, so as to compensate for changes in the speed of brush rotation, can be easily made merely by tightening or loosening the screws 56.

Thus, as is readily apparent from the above description, the present invention provides a desirable brush structure which greatly minimizes the damage caused to projecting portions of a vehicle, such as radio antennas or outside rearview mirrors, and likewise at the same time greatly minimizes damage to the brush construction. Further, the brush construction substantially eliminates these problems caused by hand-up of the bristles, while at the same time enables a substantially continuous and efficient vehicle washing operation to proceed due to the tendency for the hung-up bristles to automatically free themselves from the vehicle so as to both permit continued operaton of the vehicle washing operation, and at the same time prevent damage to both the vehicle and the car washing system. This thus avoids the necessity of having to shut down the car washing system so as to repair same. Further, these desirable results are obtained by an improved brush construction which is extremely simple to manufacture, assemble and operate.

While the invention as disclosed above, and as illustrated in the drawings, refers to a brush construction wherein the drum utilizes a pair of substantially semicylindrical shells, it will be appreciated that the construction of the drum may assume many other variations without departing from the spirit of the present invention. For example, the drum can be constructed from a plurality of elongated bars or strips fixedly connected to and extending between a pair of annular end members, such as the members 26 and 29 illustrated in FIG. 3. In the alternative, the bars or strips can be bolted directly to the outer surfaces of the semicylindrical shells 43. Further, while the accompanying drawings illustrate the bristles as being mounted within channel-shaped mounting elements which extend circumferentially of the drum, it will be appreciated that the bristles could be mounted so as to extend either axially or helically of the drum if desired. These and many other structural variations of the drum, and of the manner of mounting the bristles thereon, are disclosed in my above-mentioned copending application Ser. No. 440,284, and these modifications may be incorporated into the brush structure of the present invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a rotary brush construction, particularly for washing a vehicle, having a substantially cylindrical rotatable brush means and rotatable drive shaft means extending substantially coaxially of said brush means and drivingly coupled thereto, the improvement comprising torque limiting clutch means drivingly connecting said brush means to said shaft means for permitting slippage of said brush means relative to said shaft means when the external torque imposed on said brush means exceeds the torque transmitting capacity of said clutch means, said drive shaft means and said brush means being oriented with the rotational axes thereof extending substantially vertically, and said clutch means constituting the sole structure for both rotatably driving and supporting said brush means in a selected axial position relative to said shaft means.

2. In a rotary brush construction, particularly for washing a vehicle, having a substantially cylindrical rotatable brush means and rotatable drive shaft means extending substantially coaxially of said brush means and drivingly coupled thereto, comprising the improvement wherein said brush means includes a substantially hollow housing having a cylindrical array of bristles mounted thereon and adapted to project radially outwardly therefrom, said housing including a pair of spaced end collars disposed adjacent the opposite axial ends of said brush means, one of said end collars including an annular ringlike clutch plate fixedly secured thereto and disposed in surrounding relationship to said drive shaft means, and torque limiting clutch means drivingly connecting said brush means to said shaft means for permitting slippage of said brush means relative to said shaft means when the external torque imposed on said brush means exceeds the torque transmitting capacity of said clutch means, said clutch means including an annular driving clutch member disposed in surrounding relationship to said drive shaft means and fixedly secured thereto, said driving clutch member and said driven clutch plate having axially opposed friction surfaces disposed in frictional engagement with one another for permitting transmission of torque from said shaft means to said brush means.

3. A brush construction according to claim 2 wherein said clutch means is of the friction type.

4. A brush construction according to claim 3, further including means associated with said torque limiting clutch means for selectively adjusting the torque transmitting capacity thereof.

5. A brush construction according to claim 2 wherein said driving clutch member includes a pair of annular flange portions disposed closely adjacent one another in axially spaced relationship and defining a ringlike groove therebetween which opens radially outwardly relative to said shaft means, said annular flange portions having opposed friction pads secured thereto and defining opposite sides of said groove, and the inner radial edge portion of said driven clutch plate being disposed within said groove and positioned with the opposite surfaces thereof in frictional engagement with said friction pads.

6. In a rotary brush construction, particularly for washing a vehicle, having a substantially cylindrical rotatable brush means and rotatable drive shaft means extending substantially coaxially of said brush means and drivingly coupled thereto, the improvement comprising torque limiting clutch means drivingly connecting said brush means to said shaft means for permitting slippage of said brush means relative to said shaft means when the external torque imposed on said brush means exceeds the torque transmitting capacity of said clutch means, second bursh means of substantially cylindrical configuration disposed in surrounding relationship to said shaft means and rotatably driven thereby, said second brush means being axially spaced from said first-mentioned brush means, and means fixedly interconnecting said second brush means to said shaft means for causing rotation of said second brush means whenever said shaft means rotates.

7. A brush construction according to claim 6, further including drive means drivingly interconnected to said shaft means at a location which is spaced outwardly from the end of said first-mentioned brush means which is remote from said second brush means, and said clutch means being axially located in the vicinity of the adjacent ends of said first-mentioned and said second brush means.

8. A rotary brush construction according to claim 6, further including frame means solely supporting said shaft means adjacent one end thereof, the other end of said shaft means being free, said second brush means being disposed in surrounding relationship to said shaft means adjacent the other end thereof said first-mentioned brush means being disposed axially adjacent said second brush means and spaced between said second brush means and said one end of said shaft means, and said torque limiting clutch means being drivingly connected solely between said shaft means and said first-mentioned brush means.

9. A brush construction according to claim 8, wherein said brush means and said shaft means are disposed with the longitudinal axes thereof extending substantially vertically, and wherein said clutch means constitutes the sole structure for axially supporting said first-mentioned brush means on said shaft means.

10. A brush construction according to claim 8, wherein said frame means is coupled to the upper end of said shaft means and includes an elongated frame member projecting downwardly along said shaft means into the open interior of said first-mentioned brush means, said frame member having the lower end thereof terminating adjacent the lower axial end of said first-mentioned brush means and having bearing means associated therewith for rotatably supporting said shaft means, said clutch means being disposed directly adjacent the lower end of said frame member and being drivingly coupled to said first-mentioned brush means adjacent the lower axial end thereof, and the upper axial end of said second brush means being disposed closely adjacent said clutch means.

11. In a vehicular washing apparatus having substantially cylindrical rotatable brush means and rotatable drive shaft means coaxially aligned with and drivingly coupled to said brush means, said brush means including a cylindrical housing and a plurality of elongated flexible brush bristles fixed at one end thereof to said housing and projecting radially therefrom, the improvement comprising torque limiting clutch means drivingly connecting said brush means to said shaft means for permitting slippage of said brush means relative to said shaft means when the external torque imposed on said brush means exceed the torque transmitting capacity of said clutch means, said clutch means being of the friction type for permitting clutch slippage when the flexible brush bristles become hung up on the vehicle being washed, and adjustment means associated with said torque limiting clutch means for selectively adjusting the torque transmitting capacity thereof whereby the clutch means can be adjusted to permit slippage when an external torque is imposed on said brush means in excess of a preselected maximum.

* * * * *